No. 663,531.  
E. R. BALES.  
GEARING.  
(Application filed Jan. 15, 1900.)  
Patented Dec. 11, 1900.

(No Model.)  
2 Sheets—Sheet 1.

WITNESSES:  
Edward Thorpe  
J. B. Owens

INVENTOR  
Edward R. Bales  
BY  
ATTORNEYS

No. 663,531.  
E. R. BALES.  
GEARING.  
(Application filed Jan. 15, 1900.)  
Patented Dec. 11, 1900.

(No Model.)  
2 Sheets—Sheet 2.

WITNESSES:  
Edward Thorpe  
J B Owens

INVENTOR  
Edward R Bales  
BY  
ATTORNEYS

UNITED STATES PATENT OFFICE.

EDWARD R. BALES, OF CENTRALIA, ILLINOIS.

GEARING.

SPECIFICATION forming part of Letters Patent No. 663,531, dated December 11, 1900.

Application filed January 15, 1900. Serial No. 1,458. (No model.)

*To all whom it may concern:*

Be it known that I, EDWARD R. BALES, a citizen of the United States, and a resident of Centralia, in the county of Marion and State of Illinois, have invented new and useful Improvements in Gearing, of which the following is a full, clear, and exact description.

This invention relates to a gearing adapted especially to automobile vehicles, the object being to provide means for transmitting the driving power from the motor on the vehicle-body to the traction-axle, which means will not be influenced by the movement of the vehicle-body independently of the driving-axle.

This specification is the disclosure of one form of the invention, while the claims define the actual scope thereof.

Reference is to be had to the accompanying drawings, forming a part of this specification, in which similar characters of reference indicate corresponding parts in all the views.

Figure 1:
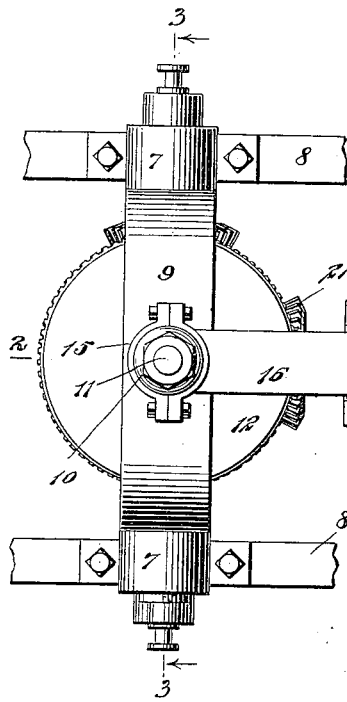
Figure 1:
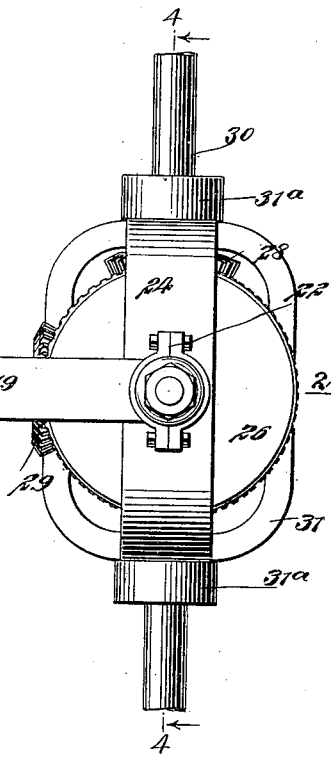
Figure 2:
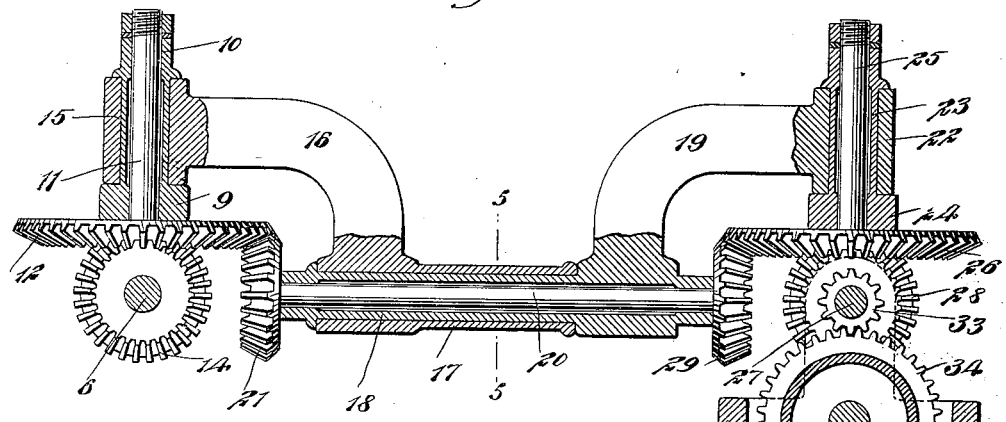
Figure 5:
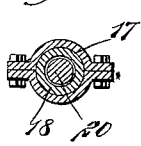
Figure 3:
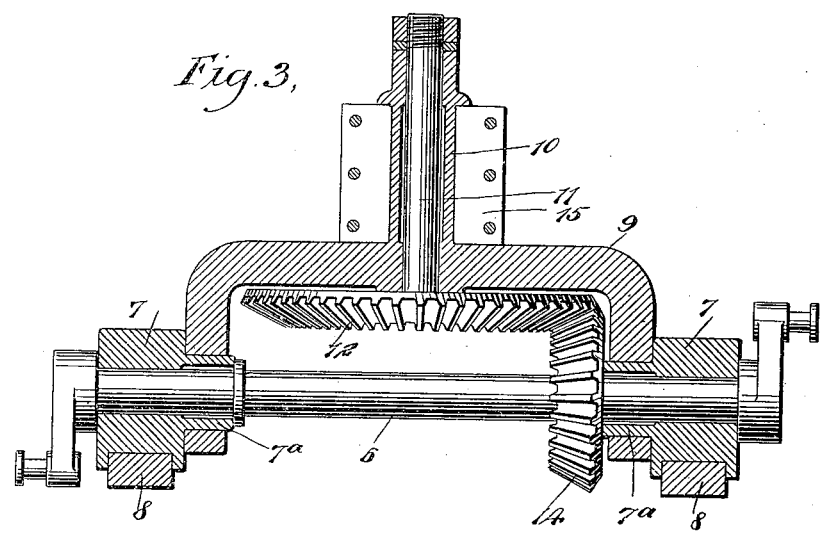
Figure 4:
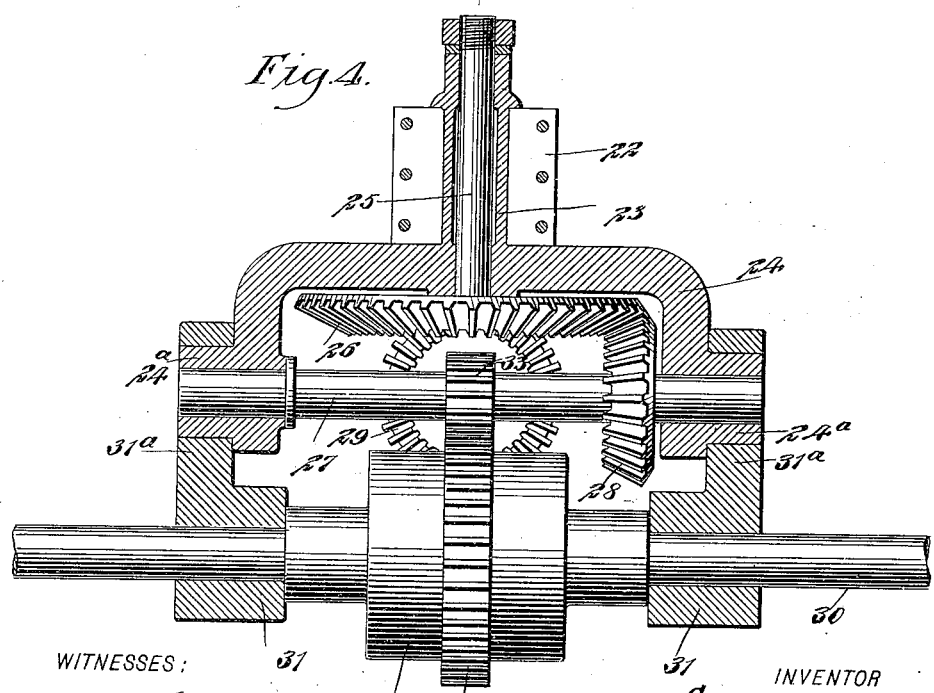

Figure 1 is a plan view of the gearing. Fig. 2 is a longitudinal section thereof on the line 2 2 of Fig. 1. Fig. 3 is a section on the line 3 3 of Fig. 1. Fig. 4 is a section on the line 4 4 of Fig. 1, and Fig. 5 is a section on the line 5 5 of Fig. 2.

The shaft 6, which is the prime mover, being driven from the motor, is mounted to turn in boxes 7, which are fastened rigidly to the vehicle-body, parts of which are indicated at 8 in Figs. 1 and 3. The boxes 7 are formed with inwardly-directed tubular extensions 7ª, respectively surrounding the shaft 6 and having the arms of a yoke 9 mounted loosely thereon, so as to permit the yoke to swing on the boxes 7 concentrically with the axis of the shaft 6. The yoke 9 has a vertically-extended tubular stanchion 10 formed thereon, which provides a bearing for the revoluble shaft 11, constituting the axis of a miter-gear 12, which is fastened to the lower end of the shaft 11 within the yoke 9 and which is driven from the shaft 6 by a miter-gear 14, as shown. It will be seen that as the yoke 9 swings around the shaft 6 the mesh of the gears 12 and 14 is not interrupted and that the gear 12 will be driven uniformly notwithstanding the movement of the yoke 9.

A box 15, carried rigidly on an arm 16, is mounted on the tubular stanchion 10, permitting the arm to turn freely around the stanchion. This arm 16 carries an elongated tubular box 17, in which is fitted to turn a corresponding box 18, the latter box being carried on an arm 19, similar to the arm 16. The parts 17 and 18 being held from sliding on each other, but being free to turn relatively, it will be seen that the arms 16 and 19 are connected securely together in such a way as to permit them to have, however, relative turning or swinging movement. Within the box 18 is mounted to turn a shaft 20, carrying at one end a miter-gear 21, which is meshed with the gear 12, so that the shaft 20 is driven from said gear, and consequently from the primary movement or drive shaft 6. Now it is clear that the arms 19 and 16, with the shaft 20 and gear 21, may turn around the axis of the tubular stanchion 10 and that this movement will not interrupt the mesh of the gears 21 and 12.

The arm 19 carries a box 22, which is similar to the box 15 and which has mounted to turn therein a tubular stanchion 23, similar to the stanchion 10. The tubular stanchion 23 is formed on a yoke 24, corresponding with the yoke 9, and the tubular stanchion 23 forms a bearing for the revoluble shaft 25, which carries at its lower end, within the yoke 24, a miter-gear 26. The yoke 24 has a countershaft 27 mounted in the arms thereof at right angles to the shaft 25 and in position to be driven from the gear 26 through the medium of a bevel-gear 28, meshing with the gear 26. The adjacent end of the shaft 20 has a bevel-gear 29 fastened thereto, and this gear 29 meshes with the gear 26 to drive the same. On the axle 30 of the vehicle is carried to turn a frame 31. The axle may be fitted with the usual compensating or differential gear contained in a box 32. The frame 31 has transversely-disposed extensions 31ª, forming bearings for trunnions 24ª, formed on the yoke 24 concentric with the axis of the shaft 27, and in which bearings the trunnions 24ª are mounted to rock. The axle 30 is driven from the shaft 29 through the medium of a pinion 33, fastened to the shaft 29, and a spur-gear 34, fastened to the axle 30. The spur-gear 34 is here shown as fast to the box 32, which in turn is fast to the axle 30. The movement of the shaft 20 is therefore transmitted to the gear 26 and from this gear to the shaft 27 and then to the axle 30. It is clear that the gears 33 and 34 need not be meshed directly together, but that the movement may be transmitted from one to the other by any desired intermediate gear. The same is true of the connection of the shaft 6 with the motor.

By means of this gearing the motor may be mounted on the vehicle-body and its force transmitted to the driving-axle of the vehicle by a positive all-gear connection and without the intervention of chains and other flexible devices, which are disadvantageous, as is well known. The various parts which carry the gearing above described are so joined that they will accommodate themselves to all of the movements of the carriage-body independently of the running-gear, thus relieving the shafts and cog-wheels of all strain due to these movements and providing a gearing which runs positively and with perfect ease during the movement of the vehicle. It will be seen that the shaft 6, having a fixed bearing on the vehicle-body, and the axle 30, having a fixed bearing on the running-gear, may move relatively in a variety of different directions. The whole gearing may be swung bodily around the extensions 7ª and concentrically to the shaft 6. The whole of the gearing may also be moved bodily around the axis of the shaft 27 and bodily around the axis of the axle 30. The groups of gearing, respectively, at the ends of the shaft 20 may turn relatively to each other around the axis of the shaft 20, owing to the rolling or turning connection between the tubular bearings 17 and 18, and the yokes 9 and 24, with the shaft 6 at the yoke 9 and the shafts 27 and 30 at the yoke 24, may be turned independently of the shaft 20 and its gears 21 and 29 on axes coincident with the axes of the shafts 11 and 25. All of these movements may be effected freely and to any degree without in any way disturbing the proper mesh of the various gears, and consequently without affecting the transmission of the power from the motor to the driving-axle.

I desire it understood that I do not consider myself confined to the precise arrangement of parts which I have here illustrated, but believe I am entitled to protection on the novel combinations of elements as defined in my claims.

Having thus described my invention, I claim as new and desire to secure by Letters Patent—

1. The combination, with a rotating member, of a frame mounted to turn around the axis thereof, a rotary shaft mounted to move with the frame and placed parallel to the axis of said rotating member, a yoke mounted to rock on the frame on an axis coincident with that of the said rotary shaft, a bevel gear-wheel mounted in the yoke to move therewith, a bevel gear-wheel fixed to the shaft and meshing with the first-named gear-wheel, and spur-gears fast respectively to the shaft and said rotating member, to transmit movement between the two.

2. The combination of a driving member, a driven member, a gear fixed to the driving member, a second gear driven by the first-named gear, a yoke in which the second gear is mounted to turn, the yoke being mounted to swing around the axis of the first-named gear, an arm by which the yoke is supported to turn on an axis coincident with that of the second-named gear, a second arm having turning connection with the first-named arm, a shaft carried by the arms, the arms turning around the axis of such shaft, a third gear attached to the shaft and meshing with the second gear to be driven thereby, a second yoke mounted to turn in the second arm, a fourth gear-wheel mounted in the second yoke and having its axis coincident with the axis of the movement of such yoke on the second arm, a fifth gear attached to the shaft and meshing with the fourth gear, a second shaft mounted to turn in the second yoke, a sixth gear fixed to the second shaft and meshing with the fourth gear, a frame for mounting the second yoke to swing on an axis coincident with that of the second shaft, such frame being mounted to turn around the axis of the driven member, and means for transmitting the movement of the second shaft to the said driven member.

3. In a gearing, the combination of a rotating member, a frame arranged to turn around the axis thereof, a second rotating member carried in the frame with its axis parallel to that of the first rotating member, a yoke mounted to rock on the frame around the axis of the second rotating member, a third rotating member carried in the yoke and having its axis disposed at an angle to those of the first and second rotating members, and means for transmitting driving movement between the three rotating members.

4. In a gearing, the combination of a frame, a yoke, one of said elements having tubular extensions loosely mounted in the other of said elements whereby the frame and yoke may have relative movement around the axes of said extensions, a rotating member mounted in the frame, a second rotating member mounted in the said tubular extensions, and means for driving one of said rotating members from the other without interference with the relative movement of the frame and yoke.

5. In a gearing, the combination of two frame members one of which has longitudinally-alined tubular extensions mounted to turn in the other, two gear members mounted respectively in the frame members, and means for driving the gear members the one from the other without interference with the relative movement of the frame members.

6. In a gearing, the combination of two frame members, the one of which is formed with a bearing and the other of which is formed with a tubular stanchion mounted to turn in the bearing whereby the frame members are allowed relative turning movement, two rotating members respectively mounted in the tubular stanchion and in the frame member carrying the bearing such rotating members having axes at angles to each other, and means for driving the rotating members the one from the other without interference with the relative movement of the said frame members.

In testimony whereof I have signed my name to this specification in the presence of two subscribing witnesses.

EDWARD R. BALES.

Witnesses:
ARCHIE C. STONE,
MILTON DUNCAN.